United States Patent Office 3,478,142
Patented Nov. 11, 1969

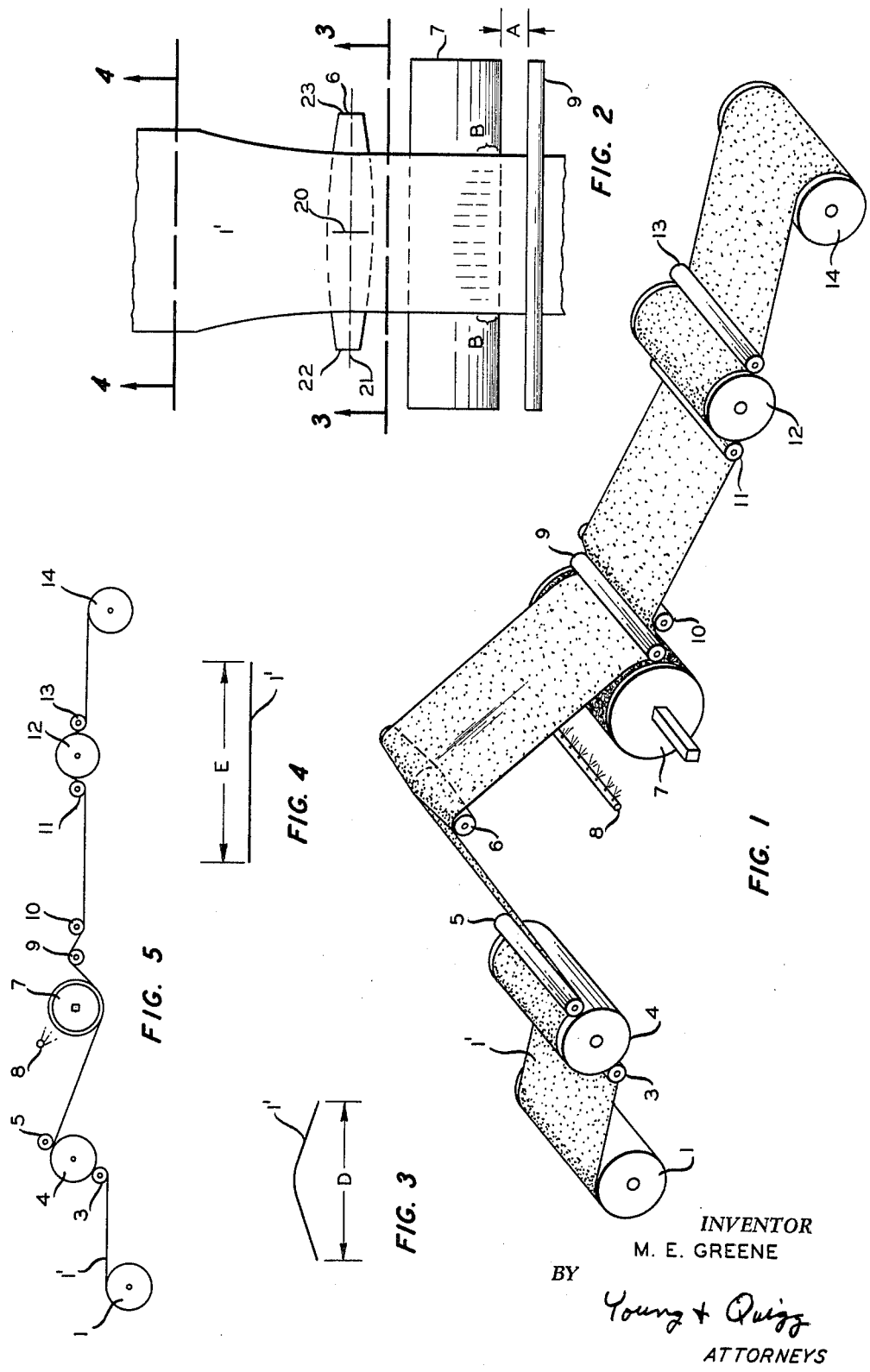

3,478,142
METHOD OF PLEATING AND STRETCHING PLASTIC FILM
Max E. Greene, Bartlesville, Okla., assignor to Phillips Petroleum Company, a corporation of Delaware
Filed Sept. 7, 1965, Ser. No. 485,172
Int. Cl. B29d 7/24
U.S. Cl. 264—288    2 Claims

ABSTRACT OF THE DISCLOSURE

A process is provided for stretching plastic film which comprises decreasing the width of said film by bowing and passing the bowed film directly into contact with a fixed frictional surface without any additional pleating operation to produce longitudinal pleats, and subsequently stretching the pleated film.

---

This invention relates to an improved method and apparatus for preparing plastic film for drawing procedures and for drawing that film. In one aspect, this invention relates to an improved method and apparatus for uniformly cold drawing a wide plastic film wherein the width projection of that film is substantially decreased and then pased over a frictional means prior to cold drawing. In another aspect, this invention relates to an improved method and apparatus for uniformly cold drawing wide plastic film which contains substantially no rubbery components wherein only a fixed frictional treatment means is employed prior to cold drawing procedures.

It is highly desirable to be able to uniformly draw wide plastic film, i.e. of a width of from at least 1 or more inches up to at least 30 or more inches. One method of doing this is to pretreat the film by repeatedly passing same over a series of grooved bars to form a multiplicity of internal fractures in the film, pleat or corrugate the thus internally fractured film, and finally flatten the corrugations, i.e. overlap the valleys and hills and then flatten same, before cold drawing.

Quite surprisingly, it has now been found that a wide plastic film can be uniformly hot or cold drawn if, before drawing, the width projection of the film is substantially reduced and then passed over a fixed frictional means to cause longitudinal pleating thereof. A major amount of the drawing can then be effected by passing the pleated film over at least one stressing roller that rotates at a speed so that the surface of the roller slips over the surface of the pleated film.

The apparatus for carrying out the method of decreasing the width projection, etc., comprises a rotatable crowned roller, i.e. a roller whose central diameter transverse to its longitudinal axis is substantally greater than its transverse diameters at either end of said roller, in turn followed by a fixed frictional means which imposes a drag on the film passing thereover. In addition, the fixed frictional means can be followed by at least one stressing roller.

It has further been found that if the film to be cold drawn is substantially free of rubbery components, i.e. contains no more than 5 weight percent based on the total weight of the film, the only pretreatment necessary is to pass the film over the above-mentioned fixed frictional means to provide a drag on the film.

The apparatus for carrying out this method and which can also be employed as the fixed frictional means in the method and apparatus discussed hereinabove comprises a curved, fixed, i.e. non-rotatable, member having a surface with a high coefficient of friction which surface can have its coefficient of friction reduced by wetting with a liquid. Such a member can be, for example, a fixed drum or arcuate member having its surface covered with about ¼ inch thick felt.

Accordingly, it is an object of this invention to provide an improved method and apparatus for preparing plastic film, and for drawing the prepared plastic film. Another object of this invention is to provide an improved method and apparatus for uniformly cold drawing wide plastic film notwithstanding the rubbery component content of the film. Another object is to provide an improved method for uniform cold drawing of wide plastic film which does not contain a substantial amount of one or more rubbery components.

FIGURE 1 shows diagrammatically a system embodying the crowned roller aspect of this invention.
FIGURE 2 shows diagrammatically a top view of the crowned roller of FIGURE 1.
FIGURES 3 and 4 show cross sections of film deformed by the crowned roller of FIGURE 1 and nondeformed film, respectively.
FIGURE 5 shows a system according to this invention for treating film containing no substantial amounts of rubbery components.

In FIGURE 1 there is shown a roll of film 1 to be processed, the film 1' from which passes through a series of restraining nip rollers 3 through 5. The film then passes over crowned roller 6 from which it passes over fixed, felt covered drum 17. Water is sprayed from 8 onto the drum to insure that the film remains at a cold drawing temperature notwithstanding frictional heat generated by passing of the film over drum 7 and to serve as a lubricant between the film and the drum. The film then passes through a series of stressing rollers 9 and 10, only two of which are shown in FIGURE 1, and then through a series of drawing nip rollers 11 through 13 to be wound onto finished film roll 14.

Restraining feed rollers 3 through 5 rotate and therefore feed film therethrough from roll 1 at a speed less than either stressing rollers 9 and 10 or drawing rollers 11 through 13 thereby applying tension to the film after it leaves restraining rollers 3 through 5. In this aspect of the invention the drawing roller speed should be sufficiently greater than the restraining roller speed to stretch the film at a ratio of at least about 2.5:1, preferably from about 3:1 to about 4:1. The stressing roller speed should be greater than the drawing roller speed so that slipping of the stressing rollers over the surface of the film occurs. Although it can vary widely, the surface speed of the stressing rollers should be at least about 2 percent greater than that of the drawing rollers.

The crowned roller is a conventional piece of apparatus which has a more or less gradually increasing transverse diameter from either end to the center point thereof, i.e. the diameter in a plane which is transverse to the longitudinal axis of the roller and intermediate of either end of said longitudinal axis is substantially greater than the diameters in similar planes at either end of the longitudinal axis of that same roller. The magnitude of increase of the central diameter of a crowned roller relative to the end diameters of that roller can vary widely but generally should be that which is sufficient to cause a decrease in width projection of film passing over the roller of from about ½ to about 20, preferably 2 to 10, percent. Thus, the crowned roller of this invention decreases the width projection of the film to furnish slack in the width dimension for subsequent uniform pleating on felt drum 7, thereby preventing the formation of oversized pleats in the film which cannot be completely removed upon subsequent cold drawing. The crowned roller also provides a clearly defined stress point which aids internal fracturing of the film in a manner similar to that obtained by a grooved bar.

It should be noted that if film containing substantial amounts of rubbery components, i.e. a component containing at least 50 weight percent rubber and/or a rubbery material, is employed it may be desirable to use a grooved bar upstream of crowned roller 6. It should also be noted that the crowned roller while decreasing the width projection of the film also smooths the film out and therefore limits the length of the pleats to the distance between the crowned roller and felt drum.

The distance between the longitudinal axes of the crowned roller and felt drum should not exceed about 3 feet and is preferably about 1 foot. It should further be noted that as this distance increases the pleats tend to become larger in cross section and less in number so that at too large a distance undesirable overpleating, i.e. the pleats have too large a cross section, can be encountered which, upon subsequent stretching, prevents substantially complete removal of the oversized pleats.

The pleated film passes over felt drum 7 in order to keep the orientation zone of the film very narrow. Drum 7 introduces a clearly defined stress point along its longitudinal axis which the film promptly passes into contact with stressing rollers 9 and 10. The promptness of contact with stressing rollers 9 and 10 is shown by the fact that the distance between drum 7 and roller 9 is generally of a magnitude of about ½ inch or less. It is in this distance that the majority of cold drawing stresses are concentrated and the film uniformly stretched to its desired length, e.g. from about 250 to about 350 percent. Stressing rollers 9 and 10 rotate faster than rollers 3 through 5 and 11 through 13 to provide both a clearly defined stressing point for the film along their longitudinal axes and a frictional force on the film in a direction opposite to that frictional force produced on the film by the drag thereon produced by felt drum 7. These two forces acting on the film cause stretching thereof to occur in the very narrow space A (FIGURE 2) between drum 7 and roller 9. It is in zone A (FIGURE 2) that most of the uniform stretching of wide width film is effected.

FIGURE 2 shows film 1' passing over both crowned roller 6, fixed drum 7, and stressing roller 9. It can be seen that due to diameter 20, which is perpendicular to longitudinal axis 21 of crowned roller 6, being larger than either of end diameters 22 and 23 of that same crowned roller, film 1' is bowed so as to reduce its width projection D (FIGURE 3) from about ½ to about 20 percent of that width projection of the original film E (FIGURE 4). The film then pases into contact with fixed drum 7 and is held in its reduced width projection by frictional forces acting between drum 7 and film 1' in the area B. Because the film is held in its reduced width projection, when forced against drum 7 it pleats in a longitudinal direction in a surprisingly uniform manner and then when passed into the stretching zone A yields a very uniformly cold drawn product.

FIGURE 3 shows film 1' as deformed by crowned roller 6. It can be seen that ample material is available between the longitudinal edges of the film to provide pleats when the film is subsequently flattened on drum 7 while being held to its reduced width projection D.

FIGURE 4 shows film 1' as it appears before passing over crowned roller 6 and therefore having a larger width projection E than it has after passing over crowned roller 6.

FIGURE 5 shows the apparatus according to another aspect of this invention which resulted from the surprising discovery that if plastic film containing only a minor amount, i.e. no more than about 5 weight percent based on the total weight of the film, of rubbery components is employed, the crowned roll of FIGURE 1 could be omitted and a still uniformly cold drawn wide plastic product obtained.

By this procedure wide width film including films having a substantial gel content can be processed at very high rates, i.e. up to least 300 feet per minute, which is as high or higher than heretofore possible. In this procedure as with other aspects of this invention the restraining and drawing rollers are driven at speeds which stretch the film in the range of from about 250 to about 350 percent of the original length.

The rubbery components which must be substantially absent from the films processed according to this aspect include any well known rubbery polymer or additive which is conventionally added to resinous plastics. Such components include natural rubber, polybutadiene, polyisobutylene, polyisoprene, copolymers of these components and other rubbery copolymers such as butadiene-styrene copolymers. These rubbery components are prepared in any conventional method such as solution or emulsion polymerization. The term "rubbery component" includes elastomeric, vulcanizable polymeric materials which after vulcanization, i.e. cross linking, possess the properties normally associated with vulcanizable rubber, including materials which when compounded and cured express reversible extensibility at 80° F. of at least 100 percent of the specimen's original length with a retraction of at least 90 percent within one minute after release of the stress necessary to elongate the specimen to 100 percent.

This invention in all its aspects can be used to treat a variety of films, e.g. from about 0.5 to about 8 mils in thickness, of any thermoplastic polymeric material which is capable of being oriented by stretching at temperatures below the melting point of the polymer. Most frequently such materials are highly crystalline polymers such as high density polymers of ethylene including polyethylene and copolymers of ethylene, with higher mono-1-olefins such as propylene or 1-butene, and crystalline or isotactic polypropylene and similar copolymers of propylene with ethylene or 1-butene. These represent a well-known class of highly crystalline polymers of mono-1-olefins having 2 to 4 carbon atoms per molecule. Examples of the suitable polymers are polyvinylidene chloride, polyamides, polyethylene terephthalate, and the like. Preferred polymers are mono-1-olefins which have a crystallinity of at least 80 percent as determined by nuclear magnetic resonance on a specimen of polymer which is in thermal equilibrium. This can be achieved by heating the specimen to ts melting point and then cooling it slowly to room temperature at a rate not exceeding 10° F. per minute.

EXAMPLE I

Polyethylene blown tubing having a wall thickness of 2 mils and being characterized by a density of 0.96 gram per cubic centimeter (ASTM D 1505–63T) and a 0.2 melt index (ASTM D 1238–62T) was laid flat to produce a film 12½ inches wide and 4 mils thick. The film was run through apparatus similar to that shown in FIGURE 2 wherein the restraining rollers 3 through 5 were run and the film was fed at a rate of about 42 feet per minute. Stressing rollers 9 and 10 were run at a rate of 335 feet per minute so that some slipping of the rollers over the film occurred. The drawing rollers 11 through 13 were run at a rate of about 142 feet per minute thereby producing a draw ratio of the drawing rollers to restraining rollers of about 3.4 to 1. The crowned roller over which the film was passed had a central diameter 20 of about 2.4 inches and outer diameters 22 and 23 of about 1.6 inches. The total length of the crowned roller was about 32 inches and it was spaced about 6 inches from the felt covered drum 7.

An extremely uniformly cold drawn film product useful for forming laminated plastic products, split fiber products and the like was produced continuously with no breakage of the film that would cause shutdown of the process.

It was observed during the operation of this process that the film was internally fractured by its passage over the crowned roller in a manner which gave substantially the same effect as was observed when similar film was passed over a grooved bar.

EXAMPLE II

Polyethylene blown tubing having a wall density of 2½ mils and characterized by a density of 0.96 gram per cubic centimeter (ASTM D 1505–63T) and a 0.2 melt index (ASTM D 1238–62T) was laid flat to produce a film 12 inches wide and 5 mils thick. The film was fed through apparatus similar to that shown in FIGURE 6 wherein restraining nip rollers 3 through 5 were run and the film fed through at a rate of about 80 feet per minute. Stressing rollers 9 and 10 were run at a rate of about 348 feet per minute. Drawing nip rollers 11 through 13 were run and the film taken off at a rate of about 277 feet per minute thereby producing a drawing roller to restraining roller ratio of about 3.5 to 1.

The process ran very well in a continuous manner notwithstanding the fact that no grooved bars, pleaters, pressing bars, or crowned rollers were employed. The surprising result of this example was that even though the process ran continuously at a high speed for an extended length of time there was, contrary to expectations, no transverse severance of the film which would cause shutdown of the system.

EXAMPLE III

Blown tubing having a wall thickness of 2½ mils was laid flat to form a film 12 inches wide and having a density of 5 mils. The tubing was composed of a blend of 66.6 weight percent of the same type of polyethylene from which the film of Example II was made and 33.3 weight percent of a blend of ethylene-butene-1 copolymer containing about 2 percent butene-1 based upon the total weight of the polymer, said copolymer having a density of about 0.95 gram per cubic centimeter and a melt index of about 0.3 to which was added about 30 weight percent based upon the total weight of the blend of polyisobutylene so that the resulting blend had a density of about 0.938 gram per cubic centimeter and a melt index of about 0.2. The resulting film therefore contained about 10 weight percent of the rubbery polyisobutylene component based upon the total weight of the film.

Restraining rollers 3 through 5 were run and the film fed at a rate of about 19 feet per minute. Stressing rollers 9 and 10 were run at a rate of about 85 feet per minute. Drawing nip rollers 11 through 13 were drawn and film taken off at a rate of about 68 feet per minute to thereby provide a drawing roller to restraining roller draw ratio of about 3.6 to 1.

During subsequent operation, the film often failed by complete transverse severance repeatedly causing complete shutdown at each such failure.

Therefore, it has been shown that the use of substantial amounts of rubbery components in films is not feasible in the apparatus of FIGURE 5.

The films produced by this invention are useful in making laminatd film products and fibrillated products, i.e. split fibers.

Reasonable variations and modifications are possible within the scope of this disclosure without departing from the spirit and scope thereof.

I claim:
1. A method for uniformly drawing wide plastic film comprising substantially decreasing the width projection of said film by bowing of same, passing said bowed film directly from said bowing and without additional pleating into contact with a fixed frictional surface to cause longitudinal pleating thereof, and then downstream of said fixed frictional surface drawing said pleated film of reduced width projection.
2. The method according to claim 1 wherein said film is cold drawn by passing from said fixed frictional surface over a rotating frictional means that is rotated at a speed such that its surface slips over the surface of said film.

References Cited

UNITED STATES PATENTS

| | | | |
|---|---|---|---|
| 3,233,029 | 2/1966 | Rasmussen | 264—288 |
| 3,331,402 | 7/1967 | Kathriner et al. | 139—305 |

FOREIGN PATENTS

| | | | |
|---|---|---|---|
| 926,085 | 5/1963 | Great Britain. | |

JULIUS FROME, Primary Examiner

HERBERT MINTZ, Assistant Examiner

U.S. Cl. X.R.

18—1; 264—287

Disclaimer and Dedication 3,478,142.—*Max E. Greene*, Bartlesville, Okla. METHOD OF PLEATING AND STRETCHING PLASTIC FILM. Patent dated Nov. 11, 1969. Disclaimer and dedication filed Dec. 28, 1971, by the assignee, *Phillips Petroleum Company*.

Hereby disclaims said patent and dedicates to the Public the remaining term of said patent.

[*Official Gazette April 11, 1972.*]